Feb. 9, 1932.  K. B. FISKE  1,844,150
SPIRAL ROTARY OVEN
Filed Feb. 27, 1931   2 Sheets-Sheet 1

Kenneth B. Fiske INVENTOR
BY Victor J. Evans
and Co.  ATTORNEY

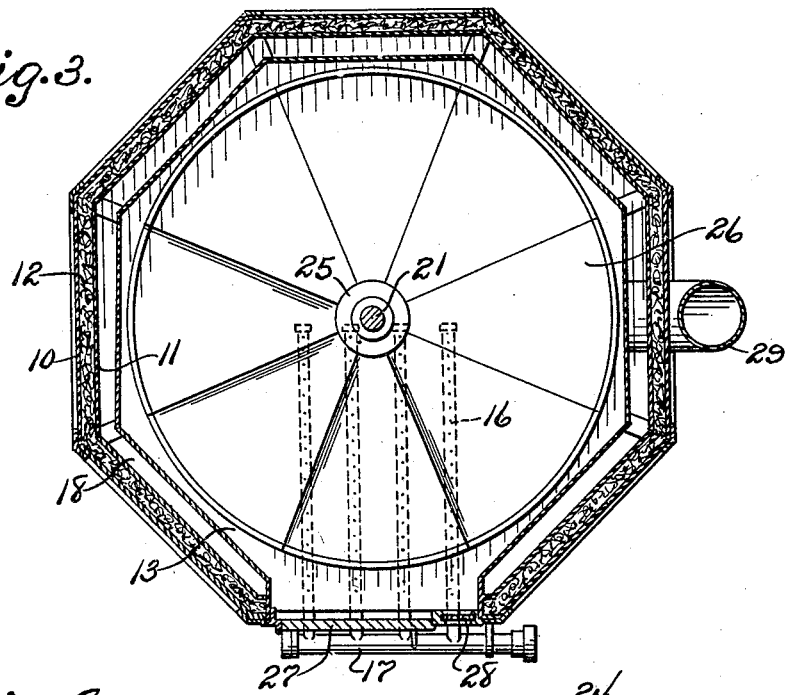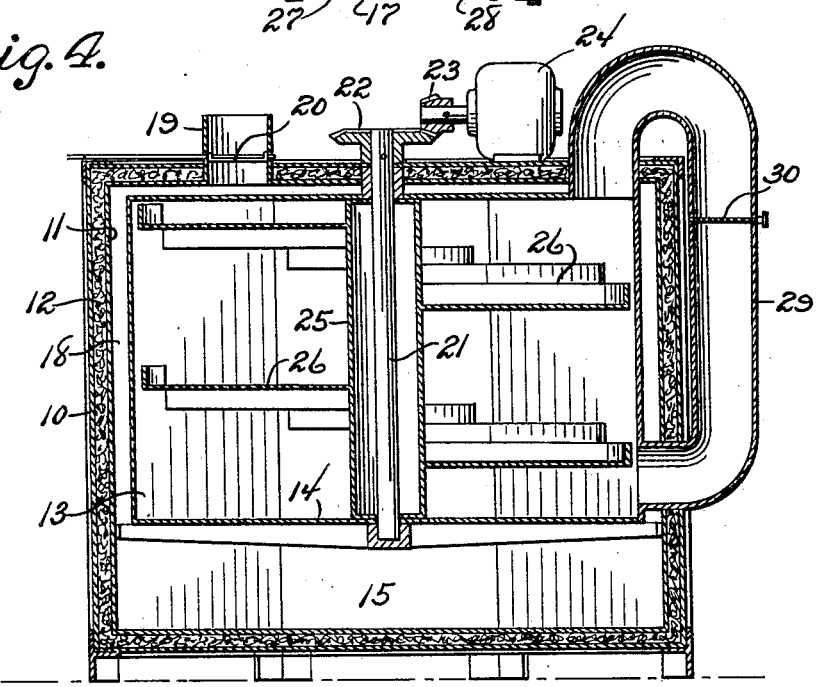

Patented Feb. 9, 1932

1,844,150

UNITED STATES PATENT OFFICE

KENNETH B. FISKE, OF CHICAGO, ILLINOIS, ASSIGNOR TO UNION STEEL PRODUCTS COMPANY, OF ALBION, MICHIGAN

SPIRAL ROTARY OVEN

Application filed February 27, 1931. Serial No. 518,864.

This invention relates to baking ovens and has for an object the provision of an oven of the rotary type wherein heat is circulated and evenly distributed, so that heat naturally ascending to the top of the oven will be returned to the bottom to again act upon the contents of said oven, and thus provide for an economy of operation.

Another object of the invention is to so arrange the interior of the oven that all of the contents thereof will be subjected to the action of heat at different elevations within the oven and therefore to varying degrees of temperature so that all of the contents will be subjected to substantially the same temperatures and an even baking assured.

With the above and other objects in view, the invention further includes the following novel features and details of construction, to be hereinafter more fully described, illustrated in the accompanying drawings and pointed out in the appended claim.

In the drawings:—

Figure 3 is a section on the line 3—3 of Figure 1.

Figure 4 is a section on the line 4—4 of Figure 2.

Figure 1:
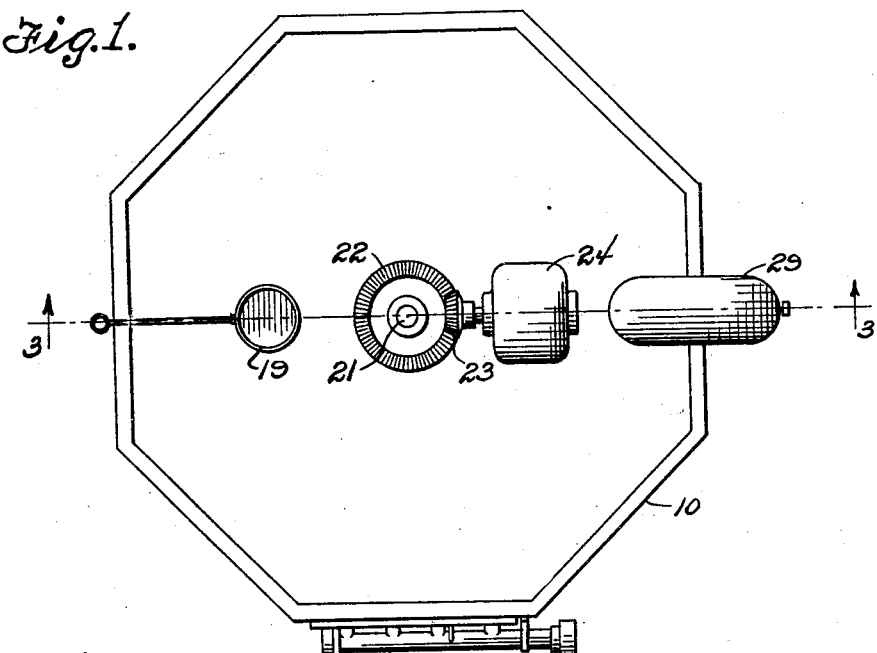
Figure 1 is a plan view of an oven constructed in accordance with the invention.
Figure 2:
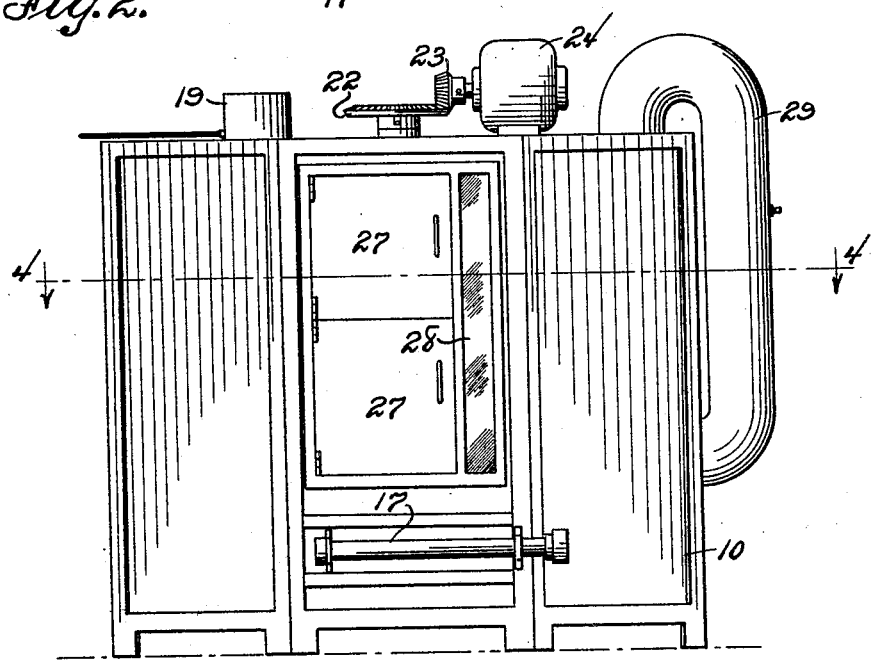
Figure 2 is a front view.

Referring to the drawings in detail wherein like characters of reference denote corresponding parts, the reference character 10 indicates the oven housing which is shown as of octagonal configuration and is provided with a lining 11 which is spaced from the outside of the housing with the space provided with a filler 12 of heat insulating material. The oven further includes a baking chamber 13 whose bottom 14 provides a horizontal partition which divides the baking chamber from the combustion chamber 15. A suitable source of heat is provided for the chamber 15, for example, a plurality of burners 16 which extend from a header 17. The walls of the oven are spaced from the lining 11 so as to provide a heat circulating space 18 which communicates with the combustion chamber 15 so that heat from the chamber 15 may circulate around the bottom, sides and top of the oven. This heat circulating space is provided with an outlet flue 19 which may be controlled by a damper 20.

Extending downwardly within the baking chamber 13 is a shaft 21. This shaft is mounted in suitable bearings and its upper end is provided with a gear 22 which is driven by a pinion 23, the latter being mounted upon the shaft of a motor 24.

The shaft 21 is enclosed within a hollow post 25 which rotates with the shaft and extending from and carried by this post is a plurality of decks 26. These decks are spirally arranged about the post 25 and may be arranged in spaced groups as shown in Figure 3 of the drawings and are adapted to contain the articles to be baked.

The front of the oven is provided with doors 27 through which the material may be inserted and removed. In addition, the front of the oven is provided with a window 28 through which the interior of the oven may be seen.

In addition, the oven is provided with a heat return conduit 29. One end of this conduit communicates with the top of the oven while the other end communicates with the oven at the bottom thereof, as shown in Figure 3 of the drawings.

In the operation of the oven, heat which naturally rises will pass out of the top of the oven through the conduit 29 and be returned to the bottom for reuse, so that heat otherwise wasted will be again used and an economy of operation will result. In addition the conduit 29 provides for a circulation of heat through the oven so that a more even temperature from the bottom to the top of the oven will be provided. While one end of the conduit 29 is shown, a number of conduits may be provided if desired. In addition, the conduit 29 may be provided with a damper or regulator 30 so as to control the circulation of heat.

By arranging the decks 26 in spiral formation and rotating these decks within the oven, each of the decks will be subjected to the action of the heat within the oven at different elevations. In other words, the topmost deck of the bottom group will be acted upon by the heat at one side of the post 25 and as the deck is rotated it will continue to be acted upon by the heat at this elevation, and as the heat ascends within the oven and is returned to the bottom through the conduit 29, this deck will again be subjected to the action of heat from the conduit mixed with heat supplied from the combustion chamber 15.

The invention is susceptible of various changes in its form, proportions and minor details of construction and the right is herein reserved to make such changes as properly fall within the scope of the appended claim.

Having described the invention what is claimed is:—

In an oven, a housing, a baking chamber therein, a rotatable shaft journaled centrally in the housing and extending through the chamber, said chamber being of less depth and cross diameter than the housing, a hollow post about said shaft and rotatably joined therewith, a plurality of decks rigidly secured to the post and arranged spirally thereof in groups, means for driving said shaft and means below the oven and within the housing for heating the same.

In testimony whereof I affix my signature.

KENNETH B. FISKE.